United States Patent [19]

Deaver et al.

[11] Patent Number: 5,433,609
[45] Date of Patent: Jul. 18, 1995

[54] FOREIGN LYRIC INSTRUCTIONAL DEVICE AND METHOD

[75] Inventors: Robert M. Deaver; Christina A. Deaver, both of New York, N.Y.

[73] Assignee: Deaver Corporation, New York, N.Y.

[21] Appl. No.: 220,973

[22] Filed: Mar. 31, 1994

[51] Int. Cl.⁶ .................................................. G09B 5/00
[52] U.S. Cl. .................................. 434/156; 434/157; 434/308; 434/319
[58] Field of Search .............. 434/156, 157, 167, 169, 434/178, 308, 318, 319

[56] References Cited

U.S. PATENT DOCUMENTS

| | | | |
|---|---|---|---|
| 4,139,954 | 2/1979 | Yamamoto | 434/157 |
| 4,170,834 | 10/1979 | Smart | 434/157 |
| 4,354,841 | 10/1982 | Meeder | 434/157 |

*Primary Examiner*—Richard J. Apley
*Assistant Examiner*—Glenn E. Richman
*Attorney, Agent, or Firm*—Handal & Morofsky

[57] ABSTRACT

A method of making an instructional recording for an individual for teaching the meaning and other aspects of an operatic piece or foreign-language song with musical and lyrical elements is disclosed. The method comprises obtaining a recording of a foreign-language song comprising music and lyrics, with said lyrics consisting of foreign-language words, that is to say, said words are in a language foreign to the individual. Playing and studying said recording determines the gaps between the foreign words in said lyrics. After obtaining a translation of said foreign language words, said translation comprises a plurality of possible word groups. Comparing the duration of said possible word groups of said translation to the duration of said gaps determines actual word groupings for recording and also determines those points corresponding to respective assigned gaps on the recording where the actual groupings will be recorded. A translation recording is then made. The translation recording is then recorded on one channel of a stereo recording medium. The recording of the operatic piece on the other channel of said stereo recording medium completes the making of the instructional recording.

18 Claims, 4 Drawing Sheets

FOREIGN LYRIC INSTRUCTIONAL DEVICE AND METHOD

TECHNICAL FIELD

This invention relates to teaching aids, and more particularly, to a device and method for foreign language instruction keyed to understanding, appreciation, expression and phrasing in operatic delivery and/or foreign language lyrical interpretation by persons who do not know the language in which musical work is sung.

BACKGROUND OF THE INVENTION

Music sung in a language foreign to the listener presents many problems. Even if the listener is fluent in the language, the poetic expression is often archaic and difficult to understand. As a result, the listener loses the dramatic and artistic essence of the piece.

Both the appreciation and singing of an operatic composition pose a unique problem to the student of opera and the singer. The singer must sing with expression and that expression must be keyed to the meaning of the words sung. At the same time, word separation, phrasing, individual artistic expression and extemporaneous and planned improvisation are often essential parts of a high quality delivery in the context of the performance, facial expressions, delivery to other characters, and audience reaction. These become elements particularly crucial when the performer is a non-native speaker of the language of performance and the listener is a native or fluent speaker or vice versa.

Even the relatively simple case of musical and lyrical instruction in the student's native language is frequently accomplished by reading books and/or receiving personalized assistance from instructors. There are literally hundreds of books on the market for teaching a variety of different musical instruments and styles. There are also many instructors having expertise in the musical field who are willing to import their knowledge for a fee.

Books generally instruct a student from a technical rather than practical perspective, such that the technique of playing an instrument or vocalizing a song properly are taught and are then applied by the student. Recordings are sometimes included with a book so as to familiarize the student with the correct manner in which the composition should be performed.

Similar to musical instruction, foreign language instruction is often received from books and personal instruction. Books often teach the technically correct manner of translation and grammar while supplemental recordings and/or instructors provide stylistic instruction as to pronunciation and accent of the foreign language. Typically, books are more easily understood by supplementing the same with recordings and/or instruction so as to allow the student to integrate the technical and stylistic aspects of the language, thereby learning the language and its usage.

However, the above-mentioned techniques are inadequate or impractical when a listener who wishes to appreciate a work or even a performer, such as a beginning student opera singer or actor, wishes to learn a foreign language opera or literary piece, without fluently learning the language.

For audience members and beginning student performers, the purpose of learning the foreign language composition, musical or literary, lies in performance and not retained knowledge of the foreign language, thereby making the traditional techniques of learning a foreign language substantially unneccessary for the performer's or audience member's goals and thus inefficient. The problem with learning a foreign opera or the like in a manner consistent with the goals of performers arises in the fact that appreciating or delivering a foreign language composition is known to be achievable and most successful when a person is familiar with the meaning of the language. Therefore, some learning is required but has been previously unobtainable without intensive study via the above techniques.

DISCLOSURE OF INVENTION

The invention as claimed is intended to provide a remedy. The invention solves the problem of how to teach a performer a musical and lyrical composition written in a language foreign without an intensive study of the foreign language.

The inventive method comprises, in the case of an operatic work, obtaining a recording of the operatic work comprising music and lyrics, with the lyrics consisting of foreign language words, that is to say, the words are in a language foreign to the individual. Playing and studying the recording determines the gaps between the foreign words in the lyrics. One then obtains a translation of the foreign language words. The translation comprises a plurality of possible word groups. Comparing the duration of the possible word groups of the translation to the duration of the gaps determines actual word groupings for recording and also determines those points corresponding to respective assigned gaps on the recording where the actual groupings will be recorded. A translation recording is then made. The translation recording is then recorded on one channel of a stereo recording medium. The recording of the operatic piece on the other channel of the stereo recording medium completes the making of the instructional recording.

For aesthetic reasons, these previously separate two channels can be blended together, after the initial mixing has occurred.

This invention combines the type of teaching obtainable through instructors and comprehensive books with reference to language pronunciation, style and vocabulary. By utilizing continuous vocalization of the foreign composition and sequential translation through the process and device disclosed, the usage and meaning of the foreign language are efficiently processed by the human brain.

The final version of inventive device in accordance with the preferred embodiment comprises a recorded instructional device in compact disc, cassette or other form having first and second audio tracks recorded primarily through the left and right channels, respectively, on a stereophonic recording medium. The first track has a first composition in a foreign language thereon and the second track has a second composition being a translation of the first composition, in a language known by the performer. The device can be played and, the tracks heard simultaneously, on conventional stereo equipment such that both the first and second tracks can be clearly discerned upon using the device.

Based upon the level of instruction required, the translation track can be varied in emphasis in comparison to the foreign language track via a balance control being turned to the appropriate side. Accordingly, for beginners, the translation track can be played more prominently than the performance track by turning the balance control to the appropriate channel.

By translating the text and weaving a dramatic narrative into the phrasing of the music, the listener has the opportunity to both understand what is being sung and appreciate its dramatic significance musically. This "translating language narrative overlay" concept eliminates the intimidation which accompanies music sung in a foreign language. It creates a broader audience and provides a more innovative means to educate the listener. It enables the listener to understand not only the language, but also the language in conjunction with the drama and intention of the music. It becomes easy and enjoyable for the listener, enabling him to fully appreciate the depths of the music.

Alternatively, the device can comprise a system and include a number of recorded devices such that as the listener becomes more adept in vocally copying the foreign composition the translation track fades in comparison to the composition track. As such, a progressive learning system is established.

BRIEF DESCRIPTION OF THE DRAWINGS

One way of carrying out the invention is described in detail below with reference to drawings which illustrate only one specific embodiment, in which.

BEST MODE FOR IMPLEMENTING THE INVENTION

Figure 1:
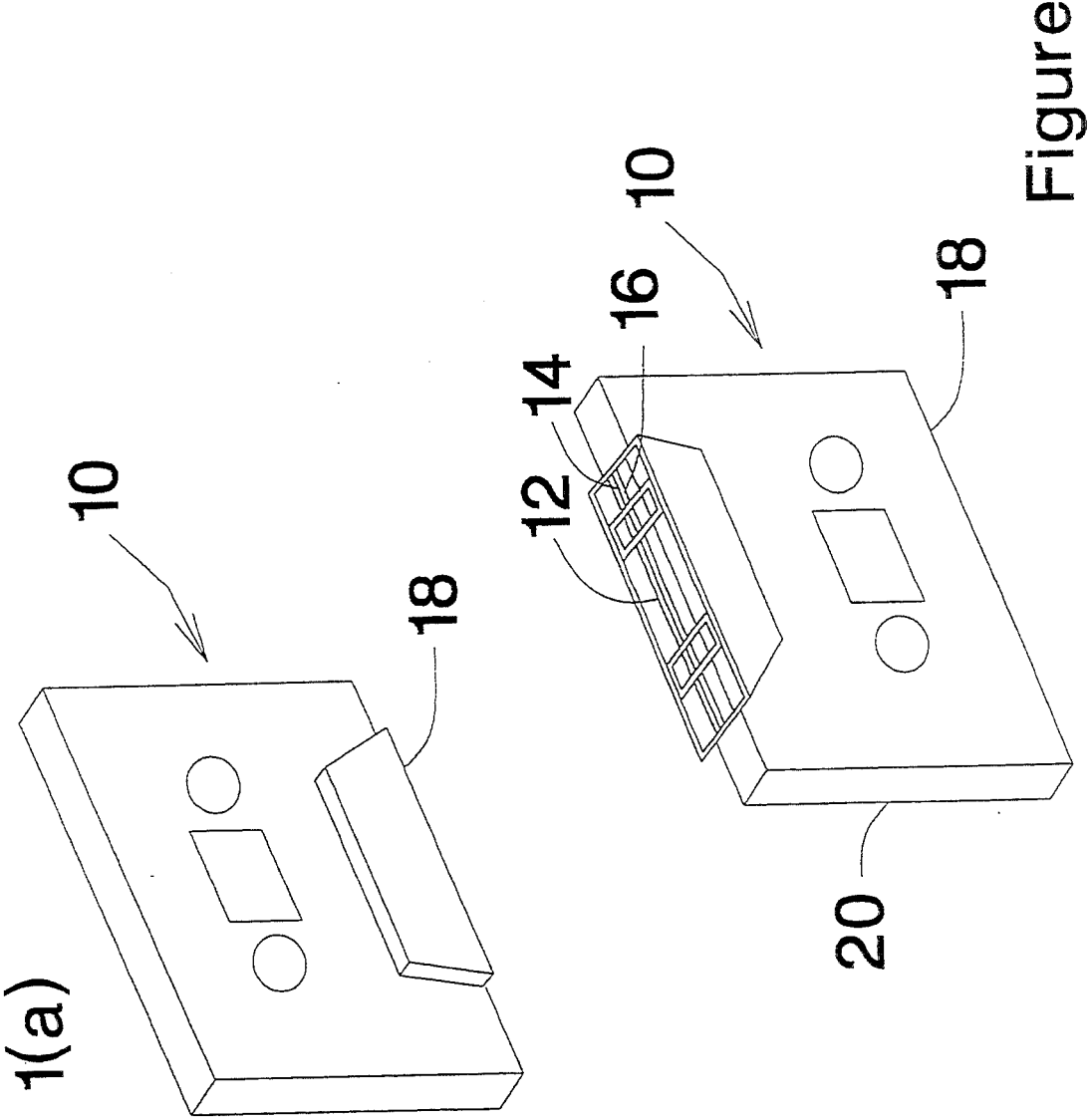
FIGS. 1(a) and 1(b) are top and bottom perspective views of the invention recorded on magnetic tape cassette and comprising a first embodiment of the inventive recording.
Figure 2:
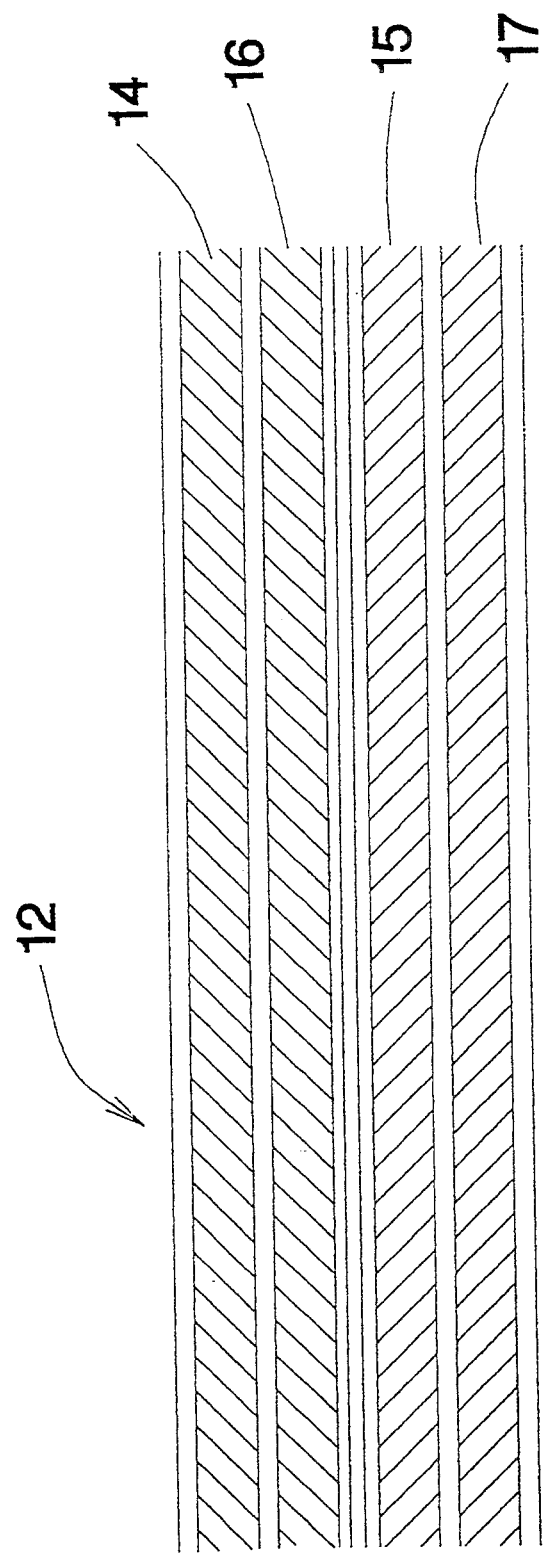
FIG. 2 a schematic view of a portion of magnetic tape indicating the position of the tracks thereon.

An instructional device 10 for teaching foreign language compositions is illustrated in FIG. 1. Device 10 includes a magnetic tape 12 having a foreign language track 14 and a translation track 16 on one-half of the tape 12. One track has the original operatic or other foreign composition recorded monaurally thereon, while the other has the translation recorded thereon.

In accordance with the preferred embodiment, the track with the translation also has a lower level version of original language piece to present a fuller, less disturbing sound. If desired, the original language recording on one track can be one component of a stereophonic recording and the other track a reduced portion of the other stereophonic component mixed with the translation and recorded on the track. Tracks 15 and 17 are located on the other half of the magnetic tape and are recorded with the continuation of the information on tracks 14 and 16, respectively. Magnetic tape 12 is enclosed by and wound in a housing 18 which together comprises a tape cassette forming the inventive device 10.

Figure 3:
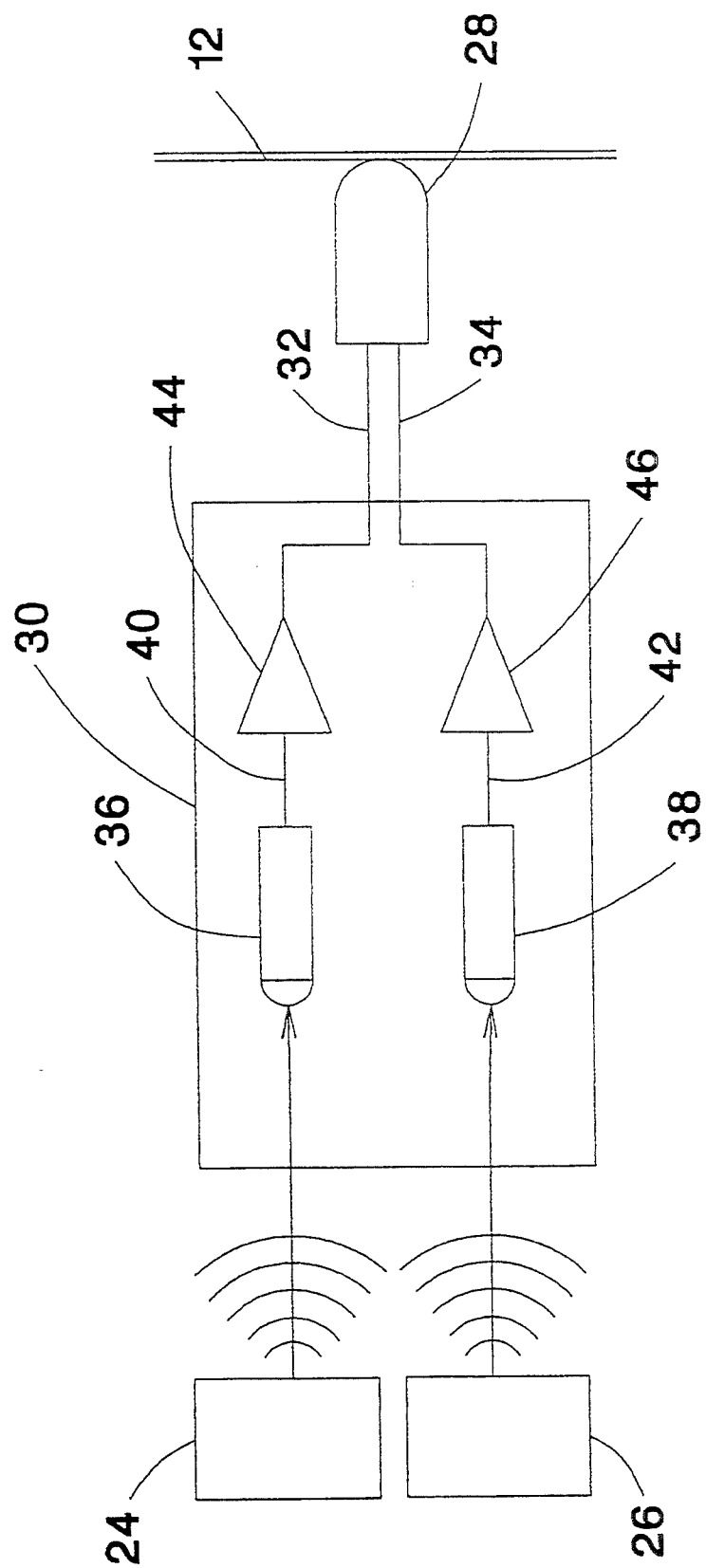
FIG. 3 is a diagram of a system for recording a foreign language composition and a translation version on the tracks of the magnetic tape of the cassette.

With reference to FIG. 3, magnetic tape 12 is of conventional nature with a magnetized magnetic material, typically a layer of iron oxide particles. The particles are magnetized to form foreign track 14 having a foreign language composition and translation track 16 with a translation composition recorded thereon. (More particularly, a foreign language composition supplied from source 24 FIG. 3) and a translation composition supplied from source 26, are recorded on the magnetic tape 12.

Tracks 15 and 17 are substantially identical in structure and use to tracks 14 and 16, respectively. Therefore, only tracks 14 and 16 will be described in detail, it being understood that the description applies equally to both sets of tracks, as well as to compact disc or other format.

Figure 4:
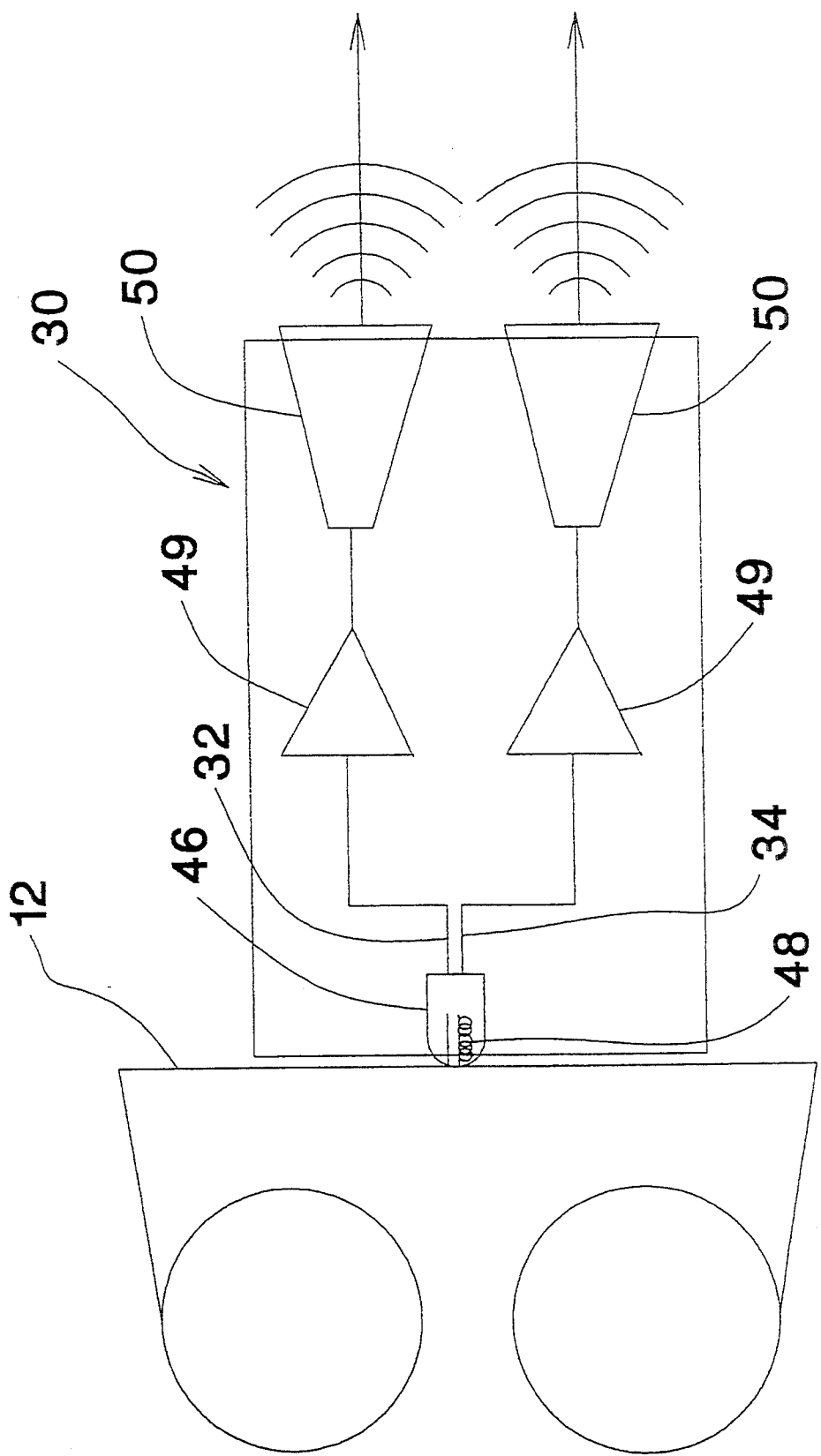
FIG. 4 is a diagram of a conventional stereo system for playing the device with conventional stereo equipment.

Referring still to FIG. 3, the result of the recordation of the tracks 14 and 16 on the magnetic tape 12, with both foreign language composition from source 24 and translation with optional original composition with reduced volume from source 26, is a simultaneous playback arrangement. Tracks 14 and 16 are spaced across the width of magnetic tape 12 for correspondence with a conventional split pick-up head 46 of a conventional stereo tape player and recorder 30, as shown in FIG. 4. Each of tracks 14 and 16 are positioned for alignment with the pick-up head to provide a signal to one of its stereophonic channels, left channel 32 and right channel 34, respectively. That is, track 14 is recorded on and plays through left channel 32, and track 16 is recorded on and plays through right channel 34.

The flip side of the tape 20, having tracks 15 and 17, can either include a continuation of the foreign composition and translation format, as discussed, or in the alternative, a recording of the foreign composition alone and uninterrupted.

The process of recording the instructional device 10 may be implemented as shown in FIG. 3, by using conventional recording equipment 30. For example, the foreign language composition from source 24 in the form of an operatic composition and the translation of the composition from source 26 are sent to inputs 36 and 38, respectively. These inputs may be microphones but may also be any suitable input such as an audio jack connected to a tape recorder output. Alternatively, these structures can be replaced with prior art digital systems. The compositions from source 24 and from source 26 take the form of electrical signals 40 and 42. Signals 40 and 42 are amplified via amplifiers 44 and 46 and are converted into variations in the magnetic field of recording head 28. These variations are subsequently recorded on the magnetic tape 12 on the separate tracks, track 14 and track 16, through left channel 32 and right channel 34, respectively.

The foreign language composition from source 24 and translated reading from source 26 are mixed and recorded through channel 32 onto a single track of the magnetic tape 12. The foreign composition from source 24 is then recorded though channel 34 onto track 16 of magnetic tape 12 without mixing the translated reading from source 26. This configuration will allow the simultaneously translated version, the untranslated version, or any mixture of the two to be heard by adjusting the playback stereo system balance and volume controls.

The instructional device 10 is used by placing it into a conventional tape player/recorder 30 having pickup head 46. The magnetic signal recorded on magnetic tape 12 in the form of the foreign track 14 and translation track 16 induces voltage oscillations in an electromagnetic coil 48 of the pickup head 46 and hence generates electrical signals which are amplified and used to energize a loudspeaker 50. Accordingly, foreign language composition from source 24 and translated reading from source 26 are reproduced in loudspeaker 50 for use by students attempting to learn the foreign language composition from source 24.

The foreign language composition from source 24 is heard via the foreign track 14 interspersed to hear the translated reading of the foreign language composition from source 24 via the translation track 16. Upon hearing both the foreign language composition from source 24 and the translation from source 26 thereof, the student can learn to copy the foreign language composition while attaching meaning to the words being copied, thereby enhancing the learning process and allowing independent study.

For example, an opera performed in a language foreign to an opera student and/or performer is recorded though channel 32 and a spoken translation of the opera in the listener's native language is recorded through channel 34. The tape 12 is then listened to by the opera student on a repetitive basis.

While listening to the tape, the information is processed by the brain by association of the proper foreign pronunciation, and correct singing style with the meaning of the foreign words in the native tongue of the performer and/or student, via the translation of the same. As a result, the foreign language is learned in a manner consistent with the immediate goals of the listener, i.e., as a continuous musical composition as opposed to random sentences and vocabulary exercises. This technique results in an efficient means to reach the goal of the listener, which includes mastering the composition without having to master the language in which it was originally written for performance.

For the more serious student, an additional learning aid may take the form of a series of instructional recording devices included in a package for the student. That is, the series will include a plurality of cassette tapes or compact discs wherein each of the tapes or discs has a foreign language composition and a translated reading of the same thereon. As the student progresses, the translated reading of the foreign composition will be less important. Therefore, the tapes or discs will also progress such that the relative volume of the foreign language composition from source 24 as compared to the translated reading from source 26 will increase such that the foreign language composition becomes louder and the translation in the language of the student becomes lesser in volume. Accordingly, more emphasis is placed on the foreign composition as opposed to the translation while the student becomes more adept in performing the composition. Alternatively, this adjustment can be done by variation of the balance control.

As alluded to above, as an alternative to using a cassette 20 for the instructional device 10, the device can also be recorded in compact disc or any other form using a similar two track format.

In order to maximize the effectiveness of the above described instructional device 10, the following method may be employed to manufacture it. The operatic piece in the original language is first made in rough mix or chestra only form, with timing in substantially final form. This part of the operatic piece comprises orchestral or instrumental left and right stereo, or monaural signals in accordance with conventional technology, and is recorded on separate tracks of a recording medium.

While other sources can be used for the tracks, or the same can be synthesized, the two-track orchestral portion can then be played into a pair of earphones being worn by an experienced singer who listens to the instrumental part of the score, studies it and works out the problems associated with the singing of the words of the operatic piece. The singer then sings the original language words and the same are recorded on a third separate track on the recording studio recording system, and in the systems recording medium. In accordance with the preferred embodiment, the operatic piece and the original language singing are then played back to the person who is to be recording the translation.

Further in accordance with the preferred embodiment of the inventive method, an experienced operatic singer acting as a narrator has the mix of the two orchestral tracks and the original language singing played into a pair of earphones being worn by the experienced singer who listens to it. Thus, the piece is listened to and a planner or the narrator (who does not have to be a singer) decides whether the gaps between sung words before or after the original language are more appropriate for insertion of the English, or other, language translation. While listening to the orchestral and original language mix, the narrator then records the translation from the original, while trying to keep all translation before or after the words being translated, as was decided in advance, as noted above. Overlapping of translation and original is kept to a minimum.

In addition, interference with the original language singing may be further minimized by selecting a pitch for narration that is different from that of the work or piece involved. In principal, depending upon the voices involved, the use of a voice of a member of the opposite sex from that of the singer of the original language piece may be employed, although it is preferable that a member of the same sex at a different pitch be used, as this will be less distracting and thus more effective.

As a practical matter, the content of the recording of the translation will suffer from numerous defects. This recording can be improved by taking the two channels of the orchestral portion of the recording and the original language recording and generating a monaural mix which will eventually be recorded on one of the channels of the final inventive cassette 10.

The monaural mix is, in accordance with the preferred embodiment then, in digitized form, put into an editing machine which also is provided with the digitized recording of the translation, which is, in accordance with the invention, to be edited for recording on the other channel of the inventive instructional cassette 10. Using conventional editing equipment, the breaths between words, as well as background and other noises are removed. This has the additional effect of shortening the duration of the translation and greatly minimizing overlap between original language sung vocal and the translation.

Overlap can be further reduced by shifting the shortened translation forward or backward in time as compared to the original language singing.

If necessary, the translation can be further shortened in duration by using the computer to find repetition of certain waveforms and removing, for example, every third, every fourth, or even every other waveform and playing the remaining waveforms back without interruption to simulate the sound of the naturally produced sound. More particularly, if in the course of the speaking of a syllable a tone at a frequency of 3000 hertz is produced for three-eighths of a second, and further if the waveform of that tone varies gradually for a substantial number of repetitions of a repeated waveform, one can remove, for example, every third waveform and the tone will have a duration of a quarter of a second. This thus makes it possible to fit the phrase containing the tone into a gap in the original foreign language recording that is an eighth of a second shorter than would otherwise required, and without overlap with the original recording.

Finally, reverberation is added to the translation in an amount greater than that used conventionally in connection with the mix of original language vocalization and orchestration. More reverberation is needed because the narrative, non-sung nature of the translation needs the "color" added by reverberation in order to blend with the score's orchestration and lyrics without unnecessary distraction.

A pair of signals comprising the (1) monaural mix of the mixed orchestration and original language lyrics, and (2) the translation signal (perhaps with a lower volume version of signal (1)) are then recorded on the two channels of a conventional stereo master. To minimize the inclusion of unnecessary noise, the translation signal is gated off whenever the translation is not on the signal. In the unlikely event of any remaining overlap between translation and original language vocal, the interference may be minimized by lowering the volume of signal (1) during such remaining overlapping in the final recording. This will allow subtle expression elements to be maximally intelligible.

Alternatively, the tracks can also be recorded stereophonically with both opera and translation complementary with the opera dominating one channel and the translation dominating the other channel audio material.

While an illustrative embodiment of the instructional device has been described above, it is, of course, understood that various modifications will be apparent to those of ordinary skill in the art. Such modifications are within the spirit and scope of the invention, which is limited and defined only by the appended claims.

We claim:

1. A method of making an instructional recording for an individual for teaching the meaning and other aspects of an operatic piece or foreign-language song with musical and lyrical elements, comprising the steps of:
   (a) obtaining a recording of an operatic piece comprising music and lyrics, said lyrics consisting of foreign language words, said words being in a language foreign to the individual;
   (b) playing and studying said recording to determine the gaps between the foreign words in said lyrics;
   (c) obtaining a translation of said foreign language words, said translation comprising a plurality of possible word groups;
   (d) comparing the duration of said possible word groups of said translation to the duration of said gaps to determine actual word groupings for recording and those points corresponding to respective assigned gaps on the recording where the actual groupings will be recorded;
   (e) making a translation recording;
   (f) recording said translation recording on one channel of a stereo recording medium; and
   (g) recording said recording of an operatic piece or foreign-language song on the other channel of said stereo recording medium.

2. A method as in claim 1, further comprising the step of generating possible word groupings by measuring the duration of an available gap and picking a word grouping that fits the duration of said available gap as closely as possible.

3. A method as in claim 2, wherein said steps of making and recording of said translation comprises the steps of listening to said recording while generating said translation in audio form, with the translation in audio form substantially occupying only said gaps.

4. A method as in claim 1, wherein said generating said translation in audio form is done by a human being and any extraneous noise is removed from the translation recording, and wherein if necessary said translation is generated by speeding up the translation of each actual word grouping to have a duration which fits into the assigned gap of each said actual word grouping.

5. A method as in claim 1, further comprising the step of editing said translation recording to remove breaths, and other environmental noises by gating the recording during recording of the same on said stereo recording medium.

6. A method as in claim 1, wherein a low volume version of said recording of an operatic piece is added to said translation recording to obtain a mixed signal, and said mixed signal is recorded on a single track of said stereo recording medium.

7. A method as in claim 1, wherein said translation recording is edited to remove redundant waveforms in portions of said translation recording in order to shorten said portions.

8. A method as in claim 1, wherein said translation recording is edited by shifting the position of portions of said translation recording to avoid overlap between said translation recording and said recording of an operatic piece.

9. A method as in claim 2, wherein said steps of making and recording of said translation comprises the steps of listening to said recording while generating said translation in audio form, with the translation in audio form substantially occupying only said gaps.

10. A recording made by the method of claim 1.
11. A recording made by the method of claim 2.
12. A recording made by the method of claim 3.
13. A recording made by the method of claim 4.
14. A recording made by the method of claim 5.
15. A recording made by the method of claim 6.
16. A recording made by the method of claim 7.
17. A recording made by the method of claim 8.
18. A recording made by the method of claim 9.

* * * * *